(12) United States Patent
Wan

(10) Patent No.: US 8,169,497 B2
(45) Date of Patent: May 1, 2012

(54) METHOD OF SEGMENTING VIDEOS INTO A HIERARCHY OF SEGMENTS

(75) Inventor: Ernest Yiu Cheong Wan, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 12/259,712

(22) Filed: Oct. 28, 2008

(65) Prior Publication Data

US 2009/0109298 A1    Apr. 30, 2009

(30) Foreign Application Priority Data

Oct. 30, 2007 (AU) ................................ 2007231756

(51) Int. Cl.
   *H04N 5/228* (2006.01)
(52) U.S. Cl. ................................. 348/222.1; 348/231.6
(58) Field of Classification Search ............... 348/222.1, 348/231.6; 382/225–228
   See application file for complete search history.

(56) References Cited

U.S. PATENT DOCUMENTS

| | | | |
|---|---|---|---|
| 6,058,210 A | 5/2000 | de Queiroz et al. | 382/232 |
| 6,807,306 B1 * | 10/2004 | Girgensohn et al. | 382/225 |
| 7,242,809 B2 * | 7/2007 | Hunter et al. | 382/224 |
| 7,375,731 B2 * | 5/2008 | Divakaran et al. | 345/581 |
| 7,630,562 B2 * | 12/2009 | Gong et al. | 382/219 |
| 2003/0058268 A1 | 3/2003 | Loui et al. | |
| 2003/0133022 A1 * | 7/2003 | Melton | 348/231.2 |
| 2004/0233987 A1 | 11/2004 | Porikli et al. | |
| 2006/0262845 A1 | 11/2006 | Prakash et al. | |

FOREIGN PATENT DOCUMENTS

JP    4-061558 A    2/1992

OTHER PUBLICATIONS

E. Deardoff, et al., "Video Scene Decomposition with the Motion Picture Parser," *MCL Technical Report Jan. 10, 1994*, Department of Electrical, Computer and Systems Engineering, Boston University, Boston, MA 02215, USA (1994).
Mar. 23, 2011 Australian Notice of Acceptance in Australian Patent Appln. No. 2007231756.

* cited by examiner

*Primary Examiner* — Gevell Selby
(74) *Attorney, Agent, or Firm* — Fitzpatrick, Cella, Harper & Scinto

(57) ABSTRACT

A method of segmenting a compressed video containing a plurality of frames into a multi-level hierarchy of video segments. The method comprises the steps of determining differences between the size of successive compressed frames in media time. The method then groups the frames to create a hierarchy of clusters of successive frames as video segments using a clustering process. The clustering process uses the size differences to determine boundaries between clusters at each level of the hierarchy.

21 Claims, 11 Drawing Sheets

| Size difference | Successive Frame Pair | |
|---|---|---|
| | Frame 1 | Frame 2 |
| $i_{11}$ | 11 | 12 |
| $i_{12}$ | 12 | 13 |
| $i_2$ | 2 | 3 |
| $i_5$ | 5 | 6 |
| $i_9$ | 9 | 10 |
| $i_1$ | 1 | 2 |
| $i_{10}$ | 10 | 11 |
| $i_8$ | 8 | 9 |
| $i_6$ | 6 | 7 |
| $i_{14}$ | 14 | 15 |
| $i_{13}$ | 13 | 14 |
| $i_3$ | 3 | 4 |
| $i_7$ | 7 | 8 |
| $i_4$ | 4 | 5 |

METHOD OF SEGMENTING VIDEOS INTO A HIERARCHY OF SEGMENTS

TECHNICAL FIELD

The current invention relates to the segmentation of digital video and, in particular, to the segmentation of compressed digital video, in a manner conducive to use by unskilled persons, such as in a home environment.

BACKGROUND

High-quality digital camcorders and cameras are widely available that are capable of capturing video footage and storing the footage directly to a mass-storage device. The storage usually involves encoding of the raw video into a compressed format suitable for efficient storage, and also communication, for example, via streaming. A number of formats exist, including those in the MPEG family, such as MPEG-2. Users, and particularly unskilled or "domestic" users tend to shoot a large amount of video content and then dump the content to a hard disk, or other storage device such as an optical CD, with the expectation that the user would be able to subsequently locate desired or interesting video segments, given the random-access nature of the storage medium and the video formats. Nevertheless, the reality is that to locate a video segment of interest, the user has to manually browse through the content in a more or less linear fashion. This is particularly the case in respect of a single clip of video capture where metadata (other than the format, file size or actual time of capture) is not generally available to permit the user to distinguish between portions of the clip. A clip is a contiguous sequence of image frames starting with an "in" frame and ending with an "out" frame. The "in" and "out" frames are usually indicative of the commencement and cessation of recording in raw video, or corresponding edit mints in edited video.

To reduce the amount of effort for locating desired or interesting video segments, some systems perform automatic segmentation of the video content. Once a video is segmented, a user can search some of the segments instead of the whole video for the interesting passages, or simply use the segments automatically created for them. Unfortunately, existing systems are far from perfect. Most perform pixel-based segmentation that detect segment boundaries using a sum of pixel differences, a sum of the number of changed pixels, motion compensated pixels differences, global/local color histograms, edge pixels, and other approaches. These methods require the video to be fully decompressed and are only possible on a more capable device such as a personal computer, as compared to a less capable device, such as the video camera by which the video was captured, or a simpler reproduction device such as a set top box (STB). Even with a personal computer, the known automatic segmentation methods demand considerable processing time. Other systems perform video segmentation in the compressed domain using features such as DCT (Discrete Cosine Transform) coefficients especially the DC component of an encoded frame, macroblock coding models, motion vector estimates, bitrate assessment, amongst other approaches. These methods are faster, but still require the video to be partially decompressed to extract the required features.

There is one particular method that is capable of using only encoding cost (that is, the number of bits used for encoding a video frame) for video segmentation and, hence, requires no decompression of the video. A cost function based on the encoding cost has to be defined for each type of image frame, such as P-type frames and I-type frames in the MPEG-2 standard. The cost for a sequence of video frames is computed using the cost function. Local maxima of the cost sequences are then compared to a pre-determined threshold to determine the existence of a segment boundary. However, when applied to so-called "home" videos using the recommended threshold value, the method often resulted in a large number of segments with very short durations.

Indeed, existing methods do not perform well on "home" videos. This is because the existing methods were mostly designed for segmenting edited video to recover the multiple shots that were originally captured and from which the edited video was formed. The existing methods look for sharp cuts and transitional effects arising from the editing process and which are not present in a typical unedited (raw) (home) video. In addition, existing methods segment a video into a single level of non-overlapping segments and do not allow a user to explore, annotate and utilise the video at different levels of granularity.

SUMMARY

In accordance with one aspect of the present disclosure there is provided a method of segmenting a compressed video containing a plurality of frames into a multi-level hierarchy of video segments, said method comprising the steps of:

(a) determining differences between the size of successive compressed frames in media time; and (b) grouping said frames to create a hierarchy of clusters of successive frames as video segments using a clustering process, wherein said clustering process uses the size differences to determine boundaries between clusters at each level of said hierarchy.

Desirably the clustering process comprises the steps of:

(ba) sorting successive pairs of said frames in increasing order of said determined size difference;

(bb) processing, in sorted order, a next pair of frames, each said frame of said next pair not being a member of an existing cluster, said processing using said pair as seed for a new cluster in a cluster growing process, and (bc) repeating step (bb) until all frames of the plurality are clustered.

The cluster growing process of the new cluster preferably comprises the steps of:

(i) selecting, in terms of media time, a neighbouring frame at one of the boundaries of the new cluster;

(ii) if said selected frame does not belong to an existing cluster, including said selected frame in the new cluster if said selected frame meets a predetermined set of clustering criteria for frames;

(iii) if said selected frame belongs to an existing cluster, including said existing cluster as a child cluster of the new cluster if said existing cluster meets a predetermined set of clustering criteria for a child cluster, and (iv) repeating step (i) to (iii) until both neighbouring frames at the boundaries of the new cluster do not meet said predetermined sets of clustering criteria.

Typically the predetermined set of clustering criteria for frames compares a set of properties of said selected frame against statistics of a subset of the frames of said new cluster on said set of properties. In some implementations the predetermined set of clustering criteria for a child cluster compares statistics of a subset of the frames of said child cluster on a set of properties against statistics of a subset of the frames of said new cluster on said set of properties. Desirably the set of properties includes at least one of the following properties: size of compressed frame, DC term, macroblock coding model, motion vectors, bitrate, dominant colour, colour histogram and the presence of people in the frame.

The method may comprise the further comprising the step of (c) merging each segment of a subset of said segments that are shorter than a predetermined duration with at least one neighbouring segment to form a second hierarchy of video segments with longer segments. The method may further comprises the step of (d) compacting said second hierarchy of video segments by flattening video segments that do not satisfy a pre-determined set of criteria of segment properties to form a third hierarchy of video segments. In some applications the method may also comprise (e) compacting a first hierarchy of video segments by flattening video segments that do not satisfy a pre-determined set of criteria of segment properties to form a second hierarchy of video segments. Desirably the predetermined set of criteria of segment properties comprises at least segment duration, and a duration of child segments.

The merging step may comprise (ca) accepting a duration threshold as input; (cb) merging consecutive short segments with duration smaller than said duration threshold into longer segments having duration longer than the duration threshold, and (cc) merging each remaining short segment with the neighbouring long segment where the joining frames of those segments comply with a predetermined set of frame properties. The merging step may alternatively comprise (ca) initialising a duration threshold to a predetermined value; (cb) merging consecutive short segments with duration smaller than said duration threshold into longer segments having duration longer than the duration threshold; (cc) merging each remaining short segment with the neighbouring long segment where the joining frames of those segments satisfy a predetermined set of frame properties, and (cd) increasing said duration threshold by a predetermined amount and repeating steps (cb) to (cc) until there is no change to the segment hierarchy in the last iteration or a pre-determined maximum for said duration threshold has been exceeded.

According to another aspect of the present disclosure there is provided a method of compacting a hierarchy of clusters, said method comprising the steps of:

(a) accepting an input, N, specifying a maximum depth for said hierarchy of clusters;

(b) selecting one deepest leaf cluster of said hierarchy of clusters;

(c) searching along a path from said selected leaf cluster to a root for a cluster, C, that satisfies a pre-determined set of criteria of cluster properties;

(d) flattening child clusters said cluster C or the child clusters of the root cluster if no cluster C is found;

(e) selecting an ancestor cluster T of said cluster C that is (N−1) levels from cluster C, or the root segment if there are less than (N−1) levels between said cluster C and the root cluster;

(f) removing all ancestor clusters between said ancestor cluster T and the root cluster and replacing the removed ancestor clusters by their related children clusters, and (g) repeating step (b) to (f) until the depth of said hierarchy of clusters is smaller than or equal to said maximum depth.

Desirably each said cluster comprises a sequence of video frames forming a segment. Preferably, said predetermined set of criteria for selecting one of the deepest leaf cluster includes criteria on duration of the segment or the duration of the child segments. This method of compacting may be used in the method of segmenting noted above.

Other aspects are also disclosed.

BRIEF DESCRIPTION OF THE DRAWINGS

At least one embodiment of the present invention will now be described with reference to the drawings, in which:

FIG. 9 is a list of frame pairs of the example frame sequences used in FIG. 8 in ascending order of their size differences.

DETAILED DESCRIPTION INCLUDING BEST MODE

Presently disclosed is a method of fast automatic segmentation of compressed video in a bottom-up manner to create a multi-level hierarchy of video segments. The method exploits certain features of unedited compressed video. When a video frame is compressed, redundancy in the frame data is removed to reduce the size of the compressed frame. Frames with similar content contain a similar amount of redundancy and therefore should be compressed by a similar amount in a properly designed compression scheme. The present inventor surmises therefore that as the content in successive frames of an unedited video changes gradually, the compressed size of the frames should also change gradually, at a more or less uniform rate. Sudden significant changes in the rate often indicate changes in the composition of the content (for example, a person moved out of view), the action of the subject (for example, a person stopped running) or camera shot (for example, changing from a normal shot to a zoom shot). The presently described methods and arrangements create a hierarchy of frame clusters from a video using a clustering approach that detects sudden local changes in the rate of change and uses such changes to determine the boundary of the clusters at each level of the hierarchy. Each cluster in the resulting cluster hierarchy is thus formed of a sequence of frames that corresponds to a segment of the video. Whilst the presently disclosed methods of video segmentation have been created with "domestic" (unskilled) users in mind, the arrangements may nevertheless be advantageously used by skilled (professional) users. Also whilst configured to operate optimally on unedited (raw) video clips, the arrangements described may nevertheless be applied to edited video clips to segment such clips if required.

Figure 10:
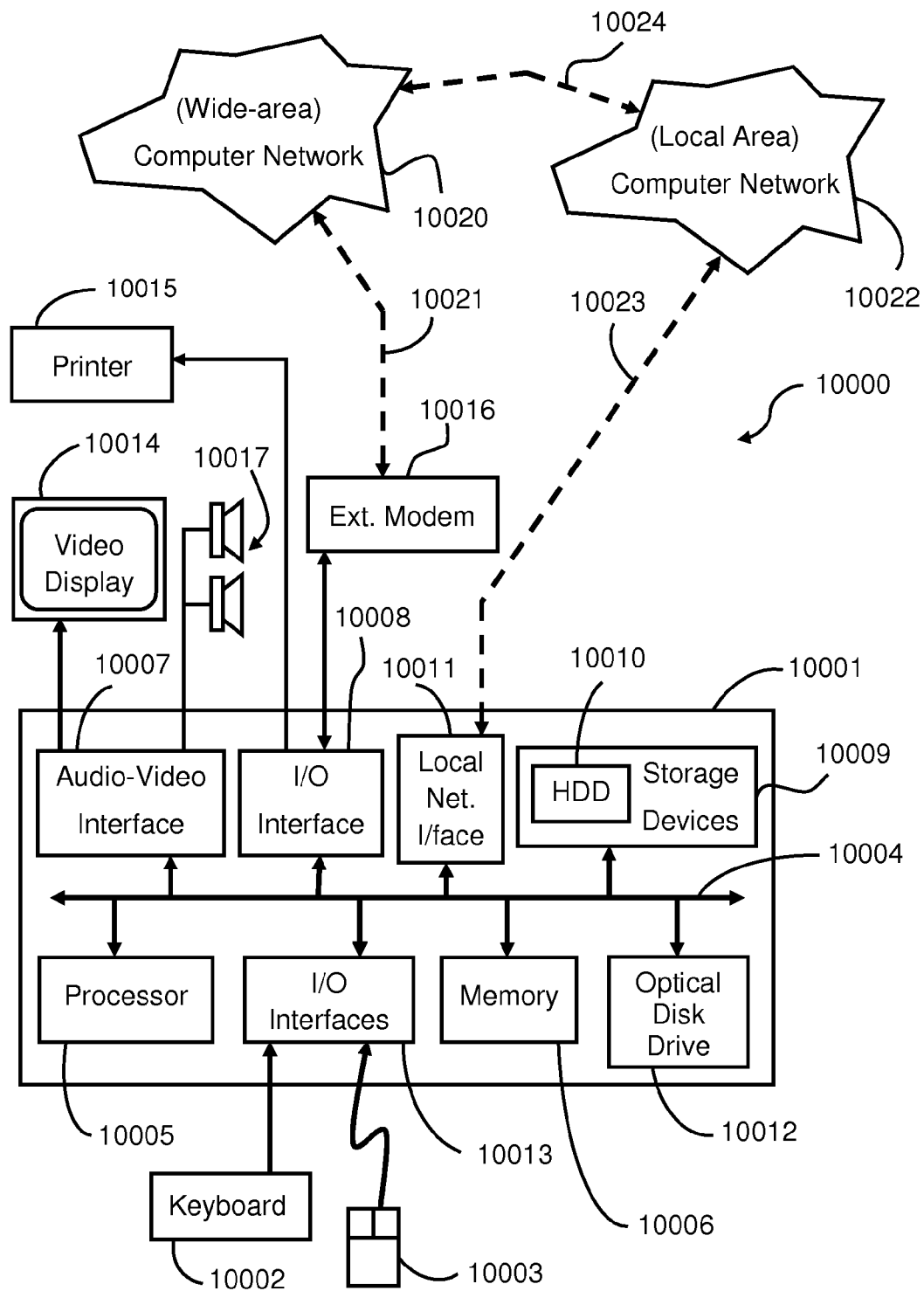
FIG. 10 is a schematic block diagram representation of a general purpose computer upon which the arrangements described can be performed.

The methods of compressed video segmentation to be described may be implemented using a computer system 10000, such as that shown in FIG. 10 wherein the processes of FIGS. 1 to 9 may be implemented as software, such as one or more application programs executable within the computer system 10000. In particular, the steps of the methods of compressed video segmentation are effected by instructions in the software that are carried out within the computer system 10000. The instructions may be formed as one or more code modules, each for performing one or more particular tasks. The software may also be divided into two separate parts, in which a first part and the corresponding code modules performs the segmentation methods and a second part and the corresponding code modules manage a user interface between the first part and the user. The software may be stored in a computer readable medium, including the storage devices described below, for example. The software is loaded into the computer system 10000 from the computer readable medium, and then executed by the computer system 10000. A computer readable medium having such software or computer program recorded on it is a computer program product. The use of the computer program product in the computer system 10000 preferably effects an advantageous apparatus for compressed video segmentation.

As seen in FIG. 10, the computer system 10000 is formed by a computer module 10001, input devices such as a keyboard 10002 and a mouse pointer device 10003, and output devices including a printer 10015, a display device 10014 and loudspeakers 10017. An external Modulator-Demodulator (Modem) transceiver device 10016 may be used by the computer module 10001 for communicating to and from a communications network 10020 via a connection 10021. The network 10020 may be a wide-area network (WAN), such as the Internet or a private WAN. Where the connection 10021 is a telephone line, the modem 10016 may be a traditional "dial-up" modem. Alternatively, where the connection 10021 is a high capacity (e.g., cable) connection, the modem 10016 may be a broadband modem. A wireless modem may also be used for wireless connection to the network 10020.

The computer module 10001 typically includes at least one processor unit 10005, and a memory unit 10006 for example formed from semiconductor random access memory (RAM) and read only memory (ROM). The module 10001 also includes an number of input/output (I/O) interfaces including an audio-video interface 10007 that couples to the video display 10014 and loudspeakers 10017, an I/O interface 10013 for the keyboard 10002 and mouse 10003 and optionally a joystick (not illustrated), and an interface 10008 for the external modem 10016 and printer 10015. In some implementations, the modem 10016 may be incorporated within the computer module 10001, for example within the interface 10008. The computer module 10001 also has a local network interface 10011 which, via a connection 10023, permits coupling of the computer system 10000 to a local computer network 10022, known as a Local Area Network (LAN). As also illustrated, the local network 10022 may also couple to the wide network 10020 via a connection 10024, which would typically include a so-called "firewall" device or similar functionality. The interface 10011 may be formed by an Ethernet™ circuit card, a wireless Bluetooth™ or an IEEE 802.11 wireless arrangement.

The interfaces 10008 and 10013 may afford both serial and parallel connectivity, the former typically being implemented according to the Universal Serial Bus (USB) standards and having corresponding USB connectors (not illustrated). Storage devices 10009 are provided and typically include a hard disk drive (HDD) 10010. Other devices such as a floppy disk drive and a magnetic tape drive (not illustrated) may also be used. An optical disk drive 10012 is typically provided to act as a non-volatile source of data. Portable memory devices, such optical disks (e.g., CD-ROM, DVD), USB-RAM, and floppy disks for example may then be used as appropriate sources of data to the system 10000.

The components 10005 to 10013 of the computer module 10001 typically communicate via an interconnected bus 10004 and in a manner which results in a conventional mode of operation of the computer system 10000 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 10010 and read and controlled in execution by the processor 10005. Intermediate storage of such programs and any data fetched from the networks 10020 and 10022 may be accomplished using the semiconductor memory 10006, possibly in concert with the hard disk drive 10010. In some instances, the application programs may be supplied to the user encoded on one or more CD-ROM and read via the corresponding drive 10012, or alternatively may be read by the user from the networks 10020 or 10022. Still further, the software can also be loaded into the computer system 10000 from other computer readable media. Computer readable storage media refers to any storage medium that participates in providing instructions and/or data to the computer system 10000 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 10001. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 10014. Through manipulation of the keyboard 10002 and the mouse 10003, a user of the computer system 10000 and the application may manipulate the interface to provide controlling commands and/or input to the applications associated with the GUI(s).

The methods to be described may alternatively be implemented in dedicated hardware such as one or more integrated circuits performing the functions or sub functions of compressed video segmentation. Such dedicated hardware may include graphic processors, digital signal processors, or one or more microprocessors and associated memories.

Typically, video content will be captured with a camera and stored in a compressed format. The compressed content is typically then transferred to a disk such as a CD, which may be inserted into the drive 10012 of the computer system 10000, or otherwise transferred to the HDD 10010, for example from the networks 10020 and 10022. The compressed video content, for example in an MPEG format, may then be read by the processor 10005 during execution of the application programs mentioned above and discussed below and from which the segmentation is formed. For example, an MPEG-2 video on a DVD disk is read in what is known as a "decoding order", which is a particular arrangement of the video's P, B and I type frames on disk to facilitate MPEG-2 decoding. The decoded frames are then assembled for reproduction in a "presentation order", representing the specific sequence of frames to be rendered on a display to reproduce the original video sequence, wherein the temporal position of a frame within the sequence is referred to as the frame's "media time".

Figure 1:
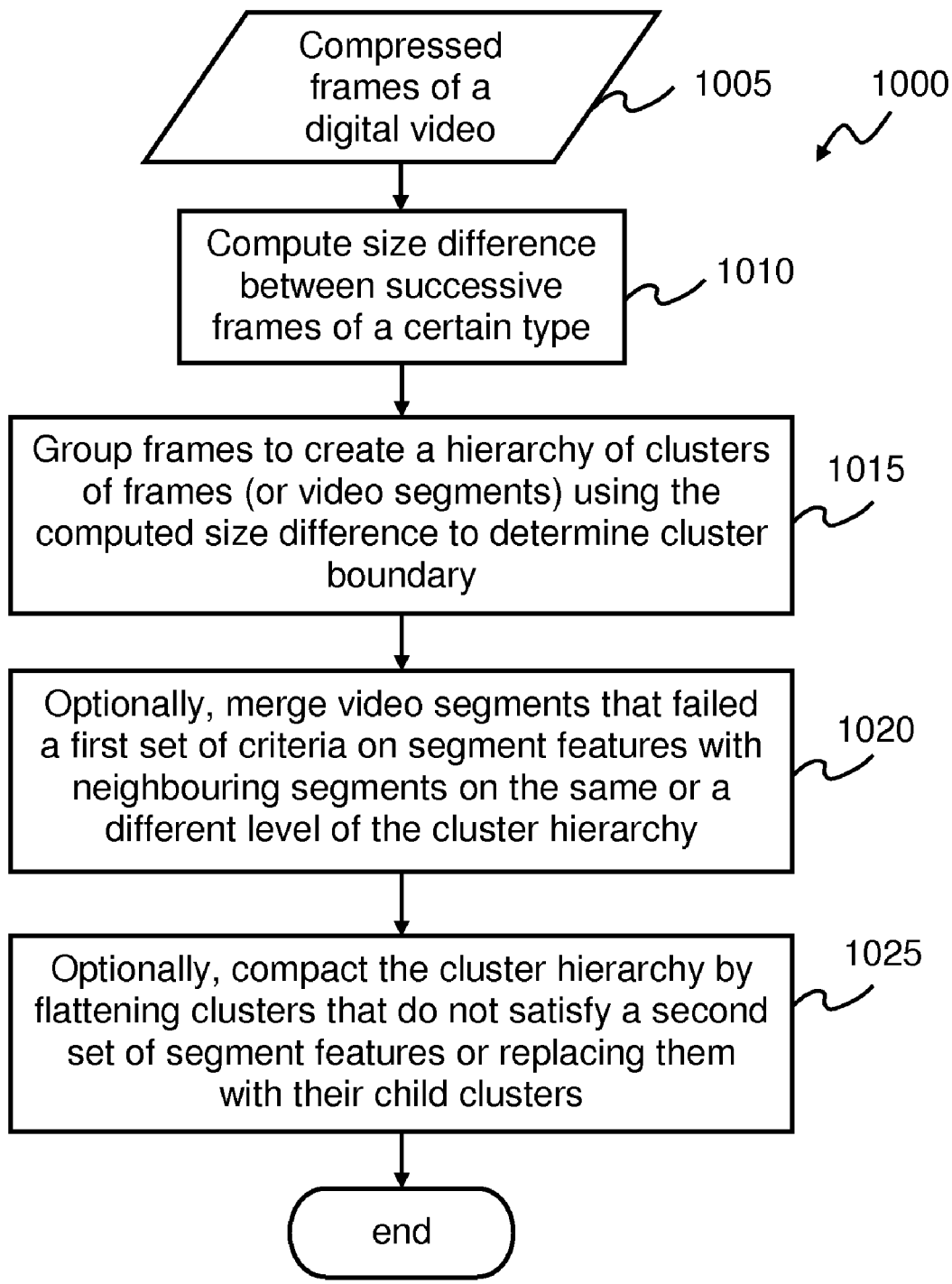
FIG. 1 is a flowchart that illustrates a method of video segmentation according to the present disclosure.

FIG. 1 depicts a method 1000 representing the key steps of the application program for compressed video segmentation. The method 1000 accepts as input a sequence of compressed frames of a digital video 1005 in media time (reproduction) order. In step 1010, the method 1000 examines each compressed frame to determine its size in terms of the number of bits or bytes of compressed video data. Step 1010 further then computes the absolute size difference between successive frames of a certain type. For example, for a MJPEG video, all frames are of the same type (i.e., simply an independently encoded JPEG frame with no inter-frame dependence), and thus the size differences of successive JPEG frames are computed. In the case of an MPEG-2 video, the size differences of successive I-frames are computed in step 1010. This is because in MPEG-2, I-frames are decoded to produce a full frame, whereas the decoding of P-frames/B-frames provides motion vectors and residue data that must be combined with one/two reference frames to provide for the reproduction of a full frame. For a P-frame, the reference frame is a preceding I or P-frame. For a B-frame, the reference frames are I or P-frames that precede or follow the B-frame. Alternatively, in MPEG-2, the size may be the size of a Group of Picture or GOP (which is a sequence of frames consisting of an I-frame and the P and B-frames that depended on the I-frame for reproduction) if the GOPs have a fixed period (that is, a fixed number of frames in each group). The size of a GOP can be determined by counting the bits or bytes between adjacent frame headers, associated with I-frames, thereby also taking into account the size of motion vectors and residue data in any intervening P and B-frames. Then, in step 1015, the frames are grouped to create a multi-level hierarchy of frame clusters. The size differences computed in step 1010 are used to determine the cluster boundary at each level of the hierarchy. Each cluster of frames constitutes a video segment. To ensure that all video segments, especially those close to the leaf segments of the hierarchy, are of a sufficient duration to convey an action or event that will be meaningful to a typical viewer, short video segments that fail a predetermined set of criteria on segment features are desirably merged to create longer video segments in an optional step 1020. Step 1020 is optional because a system may allow a skilled user, such as a professional video editor, to browse the hierarchy of video segments in a top-down manner from the root segment (which identifies the entire video) and to stop at an arbitrary level of the cluster hierarchy.

Optionally, the hierarchy of video segments may also be compacted and has its depth reduced in step 1025. Video segments that fail a second predetermined set of criteria on segment features are removed in step 1025 and replaced by their child segments to reduce the depth of the video segment hierarchy. Step 1025 is only needed if there is a limit on the maximum number of levels of video segments the video should be decomposed into. For instance, the user interface of a video playback system for a TV may allow for a maximum of 3 levels of video segments, while that of a camera may allow for only 1 level of video segments.

Figure 2:
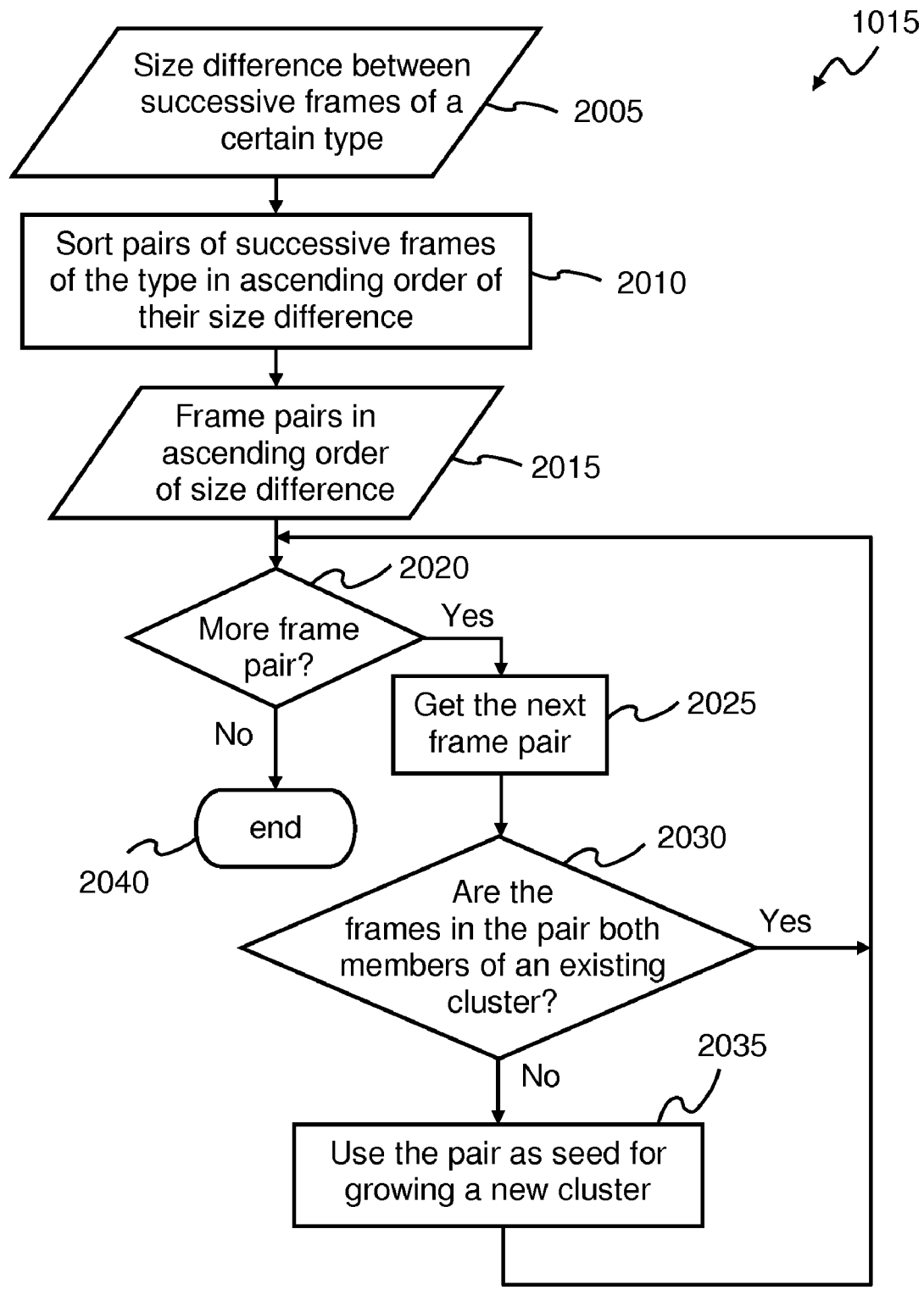
FIG. 2 is a flowchart that illustrates the key steps of the clustering process of FIG. 1 that creates a hierarchy of video segments.

FIG. 2 describes an exemplary implementation of a clustering method used in step 1015 for creating a hierarchy of frame clusters (or video segments). The absolute size differences 2005 between successive frames of a predetermined type, computed in step 1010 of FIG. 1, forms an input to the method of step 1015. These values are sorted in step 2010 in ascending order of their size difference, to form a list 2015 of frame pairs. The frame pairs in the list 2015 are then analysed in the remaining steps of FIG. 2, one pair at a time, in their sorted order. Step 2020 determines if there is a frame pair in the list 2015. If not, the clustering ends at step 2040. If so, control is transferred to step 2025, where the next frame pair in the sorted list 2015 of frame pairs is retrieved. Step 2030 then determines whether the frames in the pair are both members of an existing cluster. If so, no more processing is needed for the pair and control is returned to step 2020. Otherwise, the pair is used as a seeding pair for growing a cluster in step 2035—a process which will be described in detail below. When the growing of step 2035 is completed, control is returned to step 2020.

Figure 3:
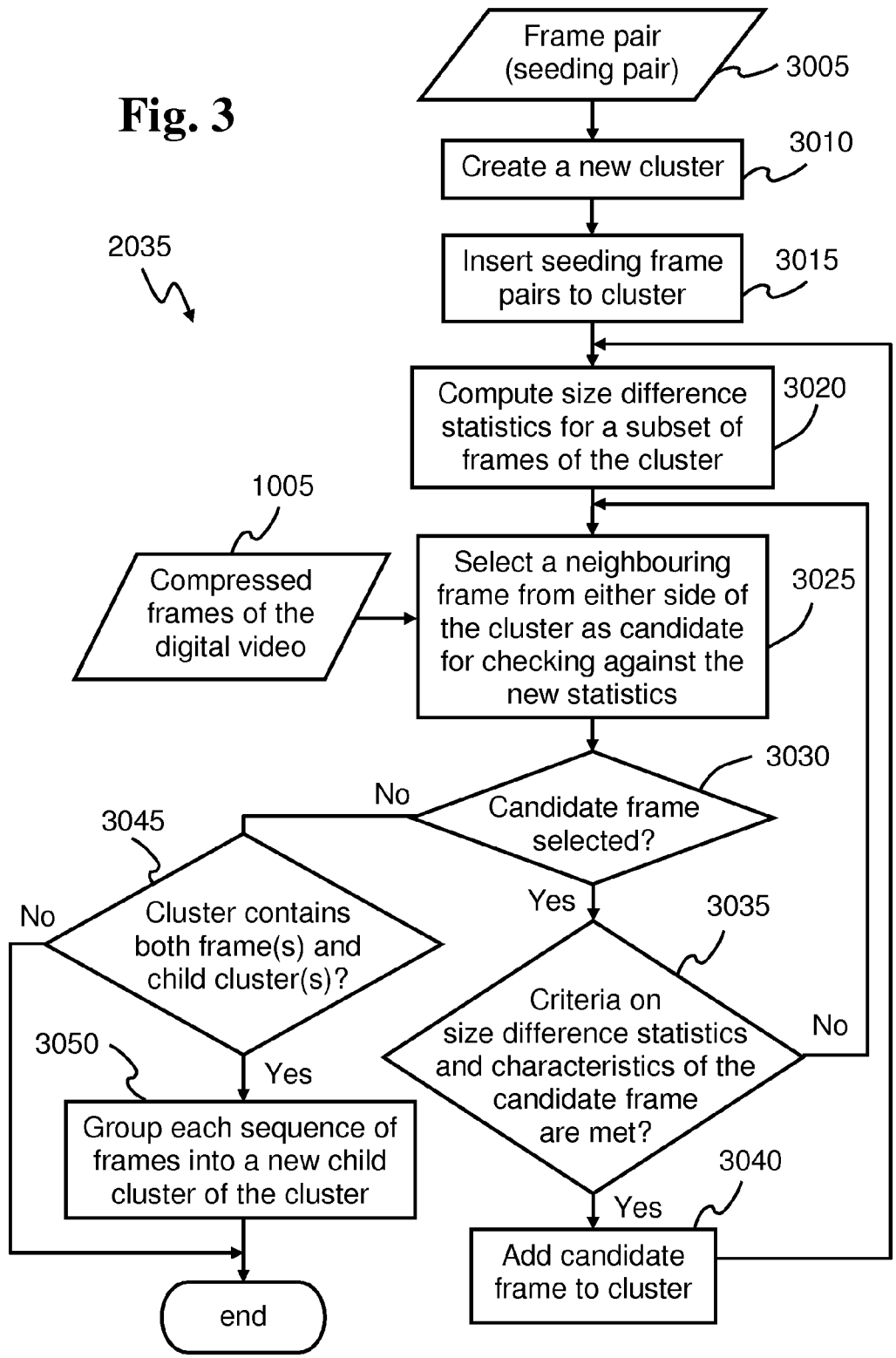
FIG. 3 is a flowchart that illustrates the key steps of the cluster growing process of FIG. 2.

FIG. 3 depicts the key steps of an exemplary approach for the cluster growing process 2035 of FIG. 2. As seen in FIG. 3, the process 2035 accepts as input a pair of frames 3005 as the seeding pair. In step 3010, an empty new cluster is created. Then, in step 3015, the seeding pair is inserted one frame at a time using the method of FIG. 4, which will be described below. After that, one or more statistics on the size differences or some function of the size differences such as $\log_{10}$(size difference), of a subset of children of the cluster, are computed in step 3020. In a preferred implementation, the standard deviation of the size differences between frames at the boundary of the child clusters, or between successive frames of the cluster, is computed. However, initially, with just two seeding frames and one size difference value, the standard deviation of the size difference cannot be computed. To bootstrap the cluster growing process, the standard deviation of the size difference is initially set to be the same as the actual size difference between the two seeding frames. In addition, if the size difference between the two seeding frames is 0, then the standard deviation is initialised to 1.

In step 3025, a neighbouring frame to the newly created cluster is selected from the input compressed frames of digital video 1005. The neighbouring frame is either the frame just before the earliest frame of the (current) cluster, or the frame just after the latest frame of the cluster in media time order. A frame will only be evaluated against the (current) cluster once. If both neighbouring frames have already been selected and failed the evaluation, no more frames will be selected.

Step 3030 checks whether a neighbouring candidate frame for the cluster is selected for evaluation. If no frame can be selected for evaluation, the growing process is completed and the newly formed cluster has reached its final size. In this case, control is transferred to step 3045 which checks whether the newly formed cluster contains both frames and child clusters. If the newly formed cluster contains only frames or only child clusters, the cluster growing process is terminated. If the newly formed cluster contains both, each sequence of frames is grouped under a new child cluster in step 3050. This ensures that all clusters contain either frames or child clusters.

If a candidate frame is identified as selected in step 3030, control is transferred to step 3035. In step 3035, the size differences between the candidate frame and its neighbouring frame in the newly created cluster, as well as some predetermined features of the frame, are checked against a set of clustering criteria for frames to decide whether the frame should be a member of the cluster. The criteria on the size difference are, at least, partly based on the size difference statistics computed in step 3020. Additional criteria can be placed on certain features of the candidate frame. Examples of such additional criteria or properties include the DC term of a DCT encoding, macroblock coding model, motion vectors, bitrate, dominant colour, colour histogram, the presence of people, amongst others. The criteria used in an exemplary implementation will be described in detail later with reference to FIG. 9. If the criteria are not met, control returns to step 3025 to select the next candidate frame. If the criteria are met, control is transferred to step 3040 which uses the method of FIG. 4 to add the candidate frame into the newly created cluster.

Figure 4:
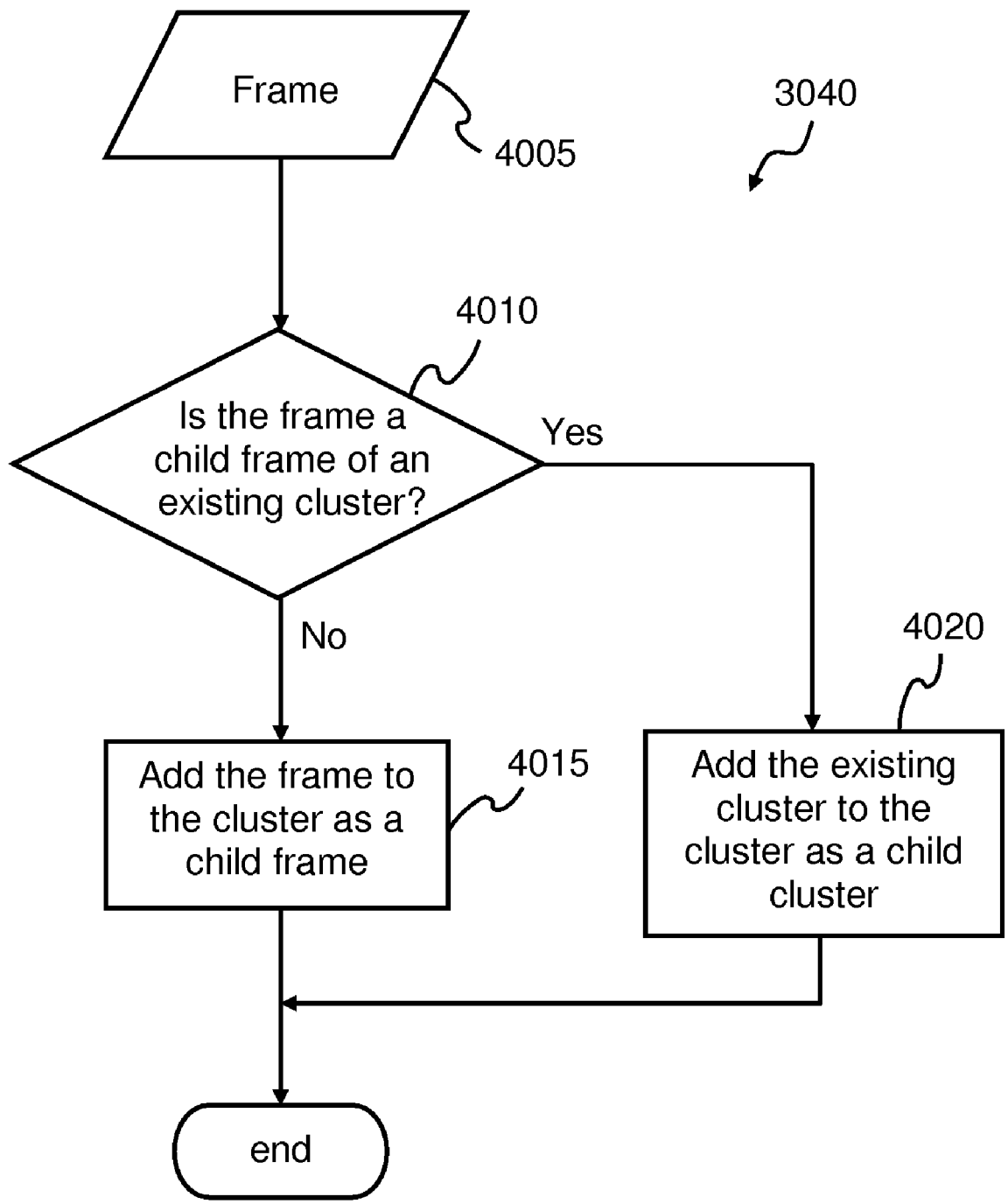
FIG. 4 is a flowchart that illustrates the steps of inserting a candidate frame to a cluster.

FIG. 4 describes the method steps 3040 involved in adding a candidate frame 4005 (or its associated cluster) to a cluster, being the current cluster created in step 3010. Step 3040 takes place only after a frame has been found to meet the criteria for a cluster. Step 4010 initially checks whether the frame 4005 is a member of or otherwise belongs to an existing cluster. If the frame 4005 is a member of an existing cluster, that existing cluster is added to the current cluster as a child cluster in step 4020. If the frame is not a member of any existing cluster, the frame is added as a child frame of the current cluster in step 4015. The term child frame of an arbitrary cluster C is used in this document to refer to a frame that is directly under the cluster C and not a frame of a descendant cluster of cluster C (i.e. the frame is a leaf of the node that corresponds to cluster C in the cluster hierarchy, and not a leaf of a branch of the node). A member of a cluster C is used to refer to a frame or a cluster directly under cluster C or under a descendant cluster of cluster C.

Figure 7:
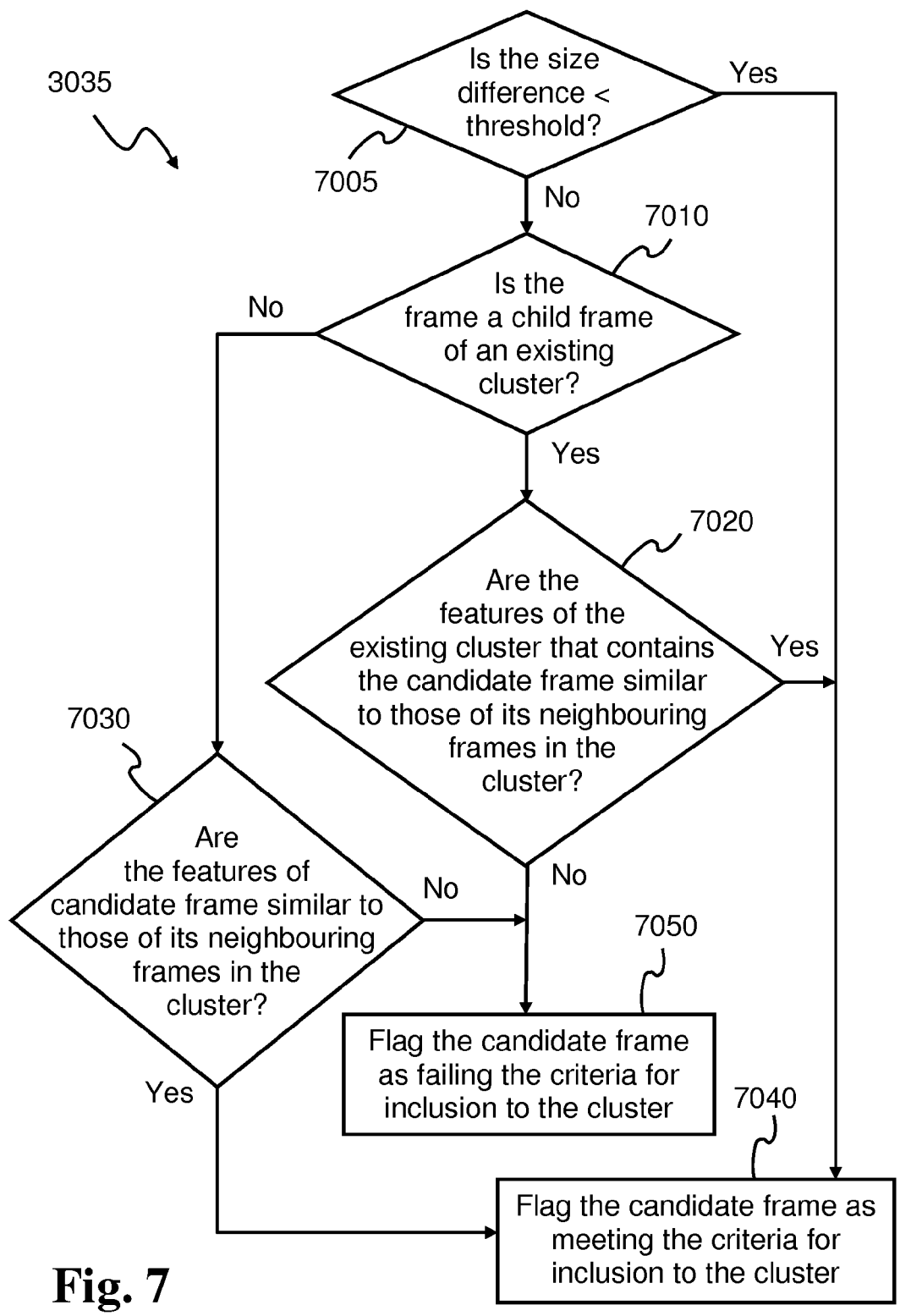
FIG. 7 is a flowchart illustrating the criteria used in the exemplary implementation to determine whether a candidate frame should be included in a cluster.

The criterion used in an exemplary implementation for determining whether a candidate frame should be included in the current cluster is described in FIG. 7. The size difference between the candidate frame and its neighbouring frame in the current cluster is tested or otherwise compared against a threshold in step 7005. If the candidate frame is a member of an existing cluster, instead of using only the size of the candidate frame, the mean size of a subset of the frames of the existing cluster closest to the current cluster (in media time) can be used in computing the size difference. In the exemplary implementation, the threshold is set to 3 times the standard deviation of the size difference of the current child members of the current cluster. This means that the change in frame size has to differ significantly from the current rate of change for a candidate frame to be rejected by the current cluster. If the size difference is smaller than the threshold, the candidate frame is flagged as meeting the criteria for inclusion into the current cluster in step 7040. If the size difference is not smaller than the threshold, control is transferred to step 7010. Step 7010 checks whether the candidate frame is already a member of an existing cluster. If so, control is transferred to step 7020; otherwise, control is transferred to step 7030. In step 7030, one or more features (or properties) of the candidate frame, such as its DC term, macroblock coding model, motion vectors, bitrate, dominant colour, colour histogram, the presence of people, for example, are checked against those of a set of its neighbouring frames in the current cluster. Typically, statistics on those features of the neighbouring frames are computed for the comparison, a similarity metric is defined for each feature and the overall similarity is computed as a weighed sum of the similarity value computed (using the similarity metric) for each individual feature. If the features are similar (for instance, the overall similarity value is larger than a pre-defined threshold), the candidate frame is flagged as meeting the criteria for inclusion into the current cluster in step 7040. Otherwise, the candidate frame is flagged as failing the criteria for inclusion into the current cluster in step 7050. If the candidate frame is found to be a member of an existing cluster in step 7010, control is transferred to step 7020. In step 7020, statistics of a subset of frames (including the candidate frame) closest to the current cluster (in media time) are computed and checked against those of a set of neighbouring frames in the current cluster. If the features are similar (for instance, the overall similarity value is larger than a pre-defined threshold), the candidate frame is flagged as meeting the criteria for inclusion into the current cluster in step 7040. Otherwise, the candidate frame is flagged as failing the criteria for inclusion into the current cluster in step 7050. In this fashion, the approach of FIG. 7 establishes a set of predetermined clustering criteria for child clusters being derived from the subset of frames including the candidate frame.

When computing size difference statistics for a cluster in step 3020 of FIG. 3, in case there are existing child clusters within the cluster, each child cluster (which may also have child clusters of its own) is treated as a single "frame" with non-zero temporal extent. That is, while the intervals between a child cluster and its neighbouring frames/child clusters are included in computing the statistics, intervals between the child cluster's own frames or child clusters are ignored.

Figure 8:
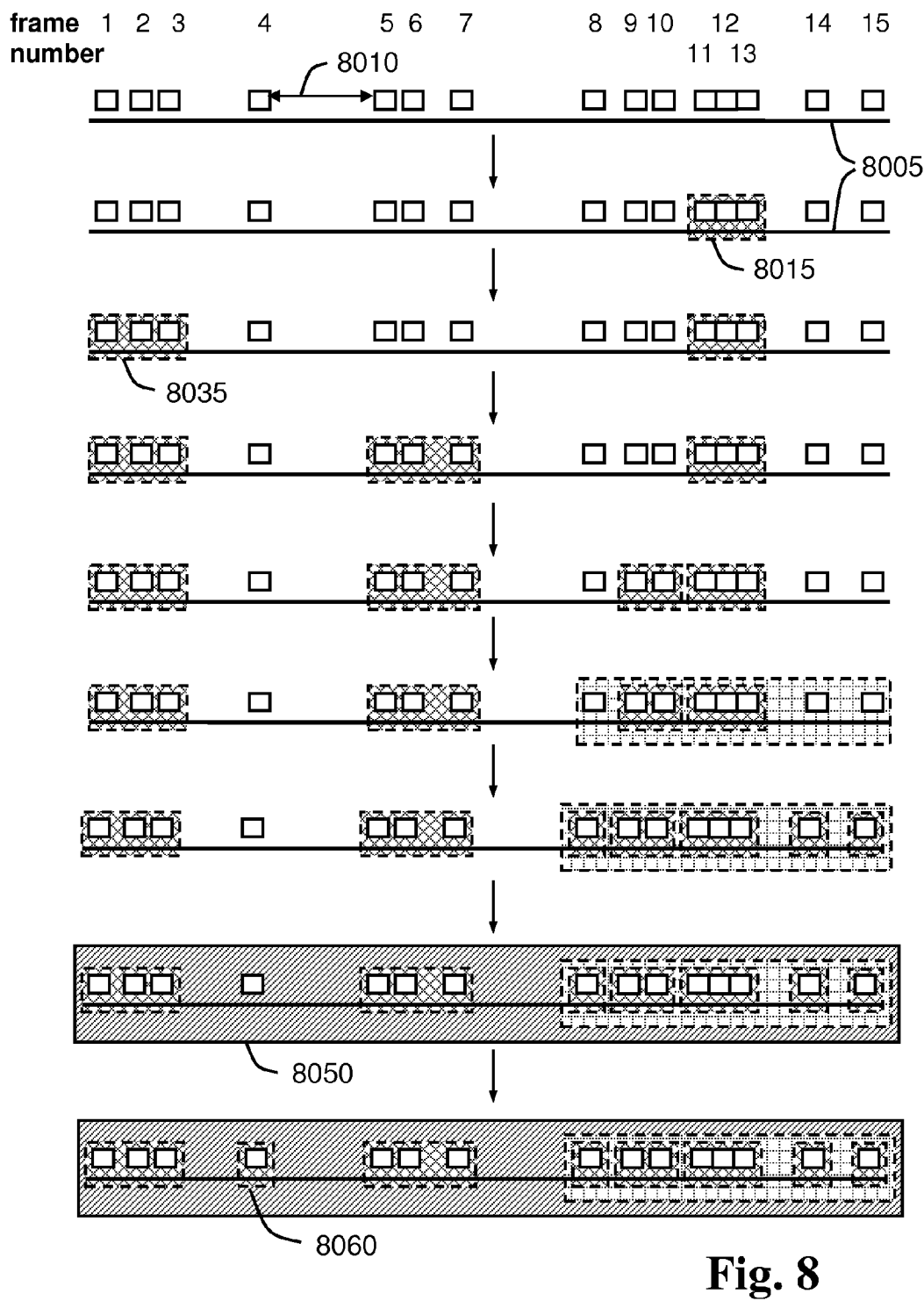
FIG. 8 is an example used for illustrating the clustering process of FIG. 1.

FIG. 8 shows a concrete example to further illustrate the working of the clustering method. The example assumes that the source video is a short video with 15 frames, each represented by a rectangle on a 'timeline' 8005. The numbers at the top of FIG. 8 are the frame number and are in media time (reproduction) order. However, the timeline is not linear. The separation represented between successive frames, for instance, 8010, is provided to indicate the (absolute) size difference between the frames. Step 2010 of FIG. 2 computes the interval of successive frames which, in this example, creates a list 9010 of FIG. 9 (equivalent to the list 2015 in FIG. 2) of frame pairs in ascending order of their size difference. The second and third columns of 9010 contain the frame number of the earlier and latter frame respectively, of a frame pair. At step 2020 of FIG. 2, it is determined that there are 14 more frame pairs to be evaluated and control transfer to step 2025 which retrieves the next frame pair, in this case, the pair of frames 11 and 12. As those frames are not members of an existing cluster—indeed, no cluster has been formed yet in this example—they are used as a seeding pair in step 2035 to grow a cluster.

A new cluster 8015 of FIG. 8 is created in step 3010 of FIG. 3. The seeding pair of frames 11 and 12 is inserted into the new cluster 8015 in step 3015. The process of FIG. 4 is used for inserting each of the frames to the new cluster 8015. Since neither frame 11 or 12 is a member of an existing cluster, step 4015 is used to add each of them to the new cluster 8015 as member frame.

The process continues from step 3020 of FIG. 3 which computes some size difference statistics for a subset of frames of the new cluster 8015. In this specific example, the standard deviation of the size difference of all successive child members (frames and clusters) in the new cluster is computed. However, for a newly created cluster with just two children, the size difference between them, in this case $i_{11}$ as seen in FIG. 9, is taken to be the standard deviation to bootstrap the growing process. Since frame 13 is closer in size than frame 10 to its neighbouring frame in cluster 8015, frame 13 is selected as the candidate frame in step 3025 of FIG. 3. As a candidate frame has been selected, step 3030 passes control to step 3035.

In step 3035, the process of FIG. 7 is used to check whether frame 13 meets the criteria required for its inclusion into cluster 8015. In step 7005 of FIG. 7, the size difference $i_{12}$ between frame 12 and frame 13 are found to be smaller than the current threshold which is ($3*i_{11}$), hence, frame 13 is flagged as meeting the criteria in step 7040. As a result, in step 3040, frame 13 is inserted into cluster 8015—again using the process of FIG. 4. Control is then transferred back to step 3020.

In step 3020, the interval statistics of cluster 8015 are recomputed. The standard deviation is now $std(i_{11}, i_{12})$. Step 3025 then selects the neighbouring frame closest in size to cluster 8015. This time, frame 10 is selected and is evaluated in a similar way to frame 13. However, in the case of frame 10, it does not meet the size difference criteria in step 7005 of FIG. 7 as $i_{10} \geq 3*std(i_{11}, i_{12})$. Since frame 10 is not a member of an existing cluster, control is transferred to step 7020. In step 7020, it is also found that the other features of frame 10 are not similar to its three neighbouring frames: frame 11, frame 12 and frame 13. Hence, frame 10 is flagged as failing the clustering criteria in step 7050 of FIG. 7. As a result, control is transferred to step 3025 of FIG. 3 which selects the next neighbouring frame, frame 14, which is closest to cluster 8015 in size.

In this example, frame 14 follows the same fate as frame 10 and fails the clustering criteria of FIG. 7. Control is again transferred back to step 3025 of FIG. 3. This time, since the neighbouring frames on the timeline at both ends of the new cluster 8015 have already been selected for evaluation, no candidate frame can be selected. Hence, in step 3030, control is transferred to step 3045 which checks whether the newly formed cluster has both frames and clusters as children. As the new cluster 8015 only has frames, it is determined that the growing process for the new cluster 8015 has been completed. Control is returned to step 2020 of FIG. 2.

As there are 13 more frame pairs in the list 9010 of FIG. 9, control is transferred to step 2025 which retrieves the next frame pair, frame 12 and frame 13. However, in step 2030, it is determined that frame 12 and frame 13 are both members of cluster 8015. Hence, control is again returned to step 2025. There are still 12 more frame pairs in the list 9010 of FIG. 9. Step 2025 retrieves the next frame pairs, frame 2 and frame 3. Since they are not members of an existing cluster, they are used as seeding pair to create a new cluster 8035 in the growing process of FIG. 4 and the clustering process continues.

The last cluster 8050 of FIG. 8 is created with the seeding pair of frame 3 and frame 4. When frame 3 is inserted into cluster 8050 using the process of FIG. 4, since frame 3 is a child frame of cluster 8035, cluster 8035 is added to the cluster as a child cluster of the new cluster 8050. After frame 4 has also been inserted into the new cluster 8050, control is transferred to step 3020 to compute the size difference statistics of cluster 8050. Cluster 8035 is considered as effectively a 'frame'. The size differences between successive frames of cluster 8035 are not used for computing the statistics. Hence, the size difference between cluster 8035 and frame 4, that is, $i_3$, is used as the standard deviation of the size difference to bootstrap the cluster growing process of FIG. 7. During the growing of cluster 8050, frame pairs: frame 7 and frame 8, and frame 4 and frame 5, are evaluated in turn. In both cases, their size differences are found to be within the size difference thresholds required by the clustering criteria, that is, $i_7 < (3*i_3)$ and $i_4 < 3*std(i_3, i_7)$. Hence, the frames or their associated cluster are added to cluster 8050. After that, there is no more neighbouring frame left for selection in step 3025. Control is transferred from step 3030 to step 3045 which checks whether the newly formed cluster has both frames and clusters as children. As cluster 8050 has one frame and three child clusters, control is transferred to step 3050. In step 3050, a new child cluster 8060 is created to hold the frame so that cluster 8050 only has child clusters.

When control is returned to step 2020 of FIG. 2, there are two more frame pairs left in the list 9010 of FIG. 9. However, both pairs are members of cluster 8050. Hence, they are both skipped by the decision step 2030 of FIG. 2. After that, there are no more frame pairs in the list 8010 and the clustering process of FIG. 2 ends.

The described processes create a hierarchy of clusters of frames, where each cluster corresponds to a video segment. The segment hierarchy may be presented as metadata together with the compressed video source to thereby permit independent application programs to drill down into the metadata to identify video segments, at finer and finer temporal granularities. The boundary of the segments may ultimately be identified by frame numbers, media time stamp, or bit or byte offsets from the start of the video. Some of the video segments in the hierarchy may be very short. For some applications such as a video player, video segments that are shorter than say 1 or 2 seconds is hardly informative to a viewing user and, at the same time, very annoying to watch. Some such segments may correspond to intermittent pauses in longer events. Merging adjacent ones of these very short segments into longer segments typically produces more acceptable and meaningful video segments for playing back. In step 1020 of FIG. 1, a set of criteria on segment duration can be specified to merge or join short video segments into longer video segments. Additional criteria can also be placed on certain features of the segments' frames such as their DC term, macroblock coding model, motion vectors, bitrate, dominant colour, colour histogram, the presence of people, etc. Merging of segments as described may however not be desired, for example where the segmentation is intended as an input or guide to a professional editing of the video source.

Figure 5A:
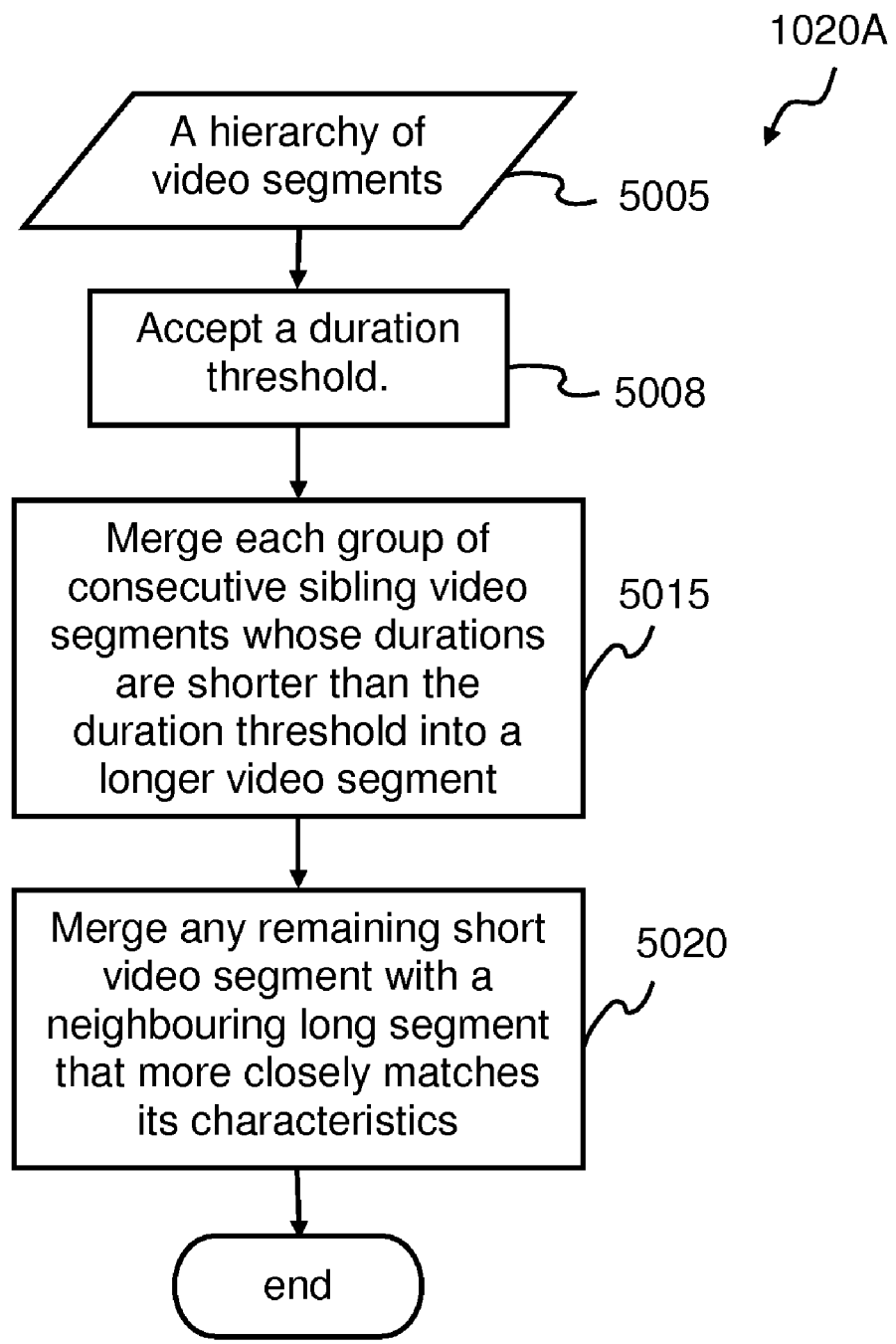
FIGS. 5A and 5B are flowcharts illustrating the key steps of the process used for merging short video segments of a video segment hierarchy into longer segments in an exemplary implementation and in an alternative implementation, respectively.

FIG. 5A shows one example 1020A of the merging process of step 1020. In step 5005, the process 1020A accepts as input a duration threshold. The duration threshold defines the minimum duration of a meaningful event or action, and effectively a time scale. Video segments that are shorter than the duration threshold are considered as not effective in conveying meaningful information and would not be used or presented on their own. A duration threshold of 3 seconds can be effectively used. In step 5015, the duration of the video segments is checked in a top-down manner starting from the root of the hierarchy. Each group of consecutive sibling video segments whose duration is shorter than the current duration threshold is merged or joined into a longer video segment. If a video segment being merged has child segments, it is flattened first. By flattening a segment, any nested segment structure within the segment (but not the frames inside the structure) is removed reducing the segment into a simple sequence of frames. At the completion of step 5015, the video segment hierarchy may still have segments that are shorter than the current duration threshold interleaving between longer segments. These remaining short video segments are not considered as meaningful to be used or presented on their own. In step 5020, each of these remaining short segments, if any, is merged with the neighbouring long video segment that more closely matches its features. In one implementation, a short video segment is merged with the neighbouring long video segments whose local mean frame size at the boundary of the two segments is closer to that of the short segment. At the completion of step 5020, the duration of all the video segments of the hierarchy will be equal to or greater than the duration threshold.

Figure 5B:
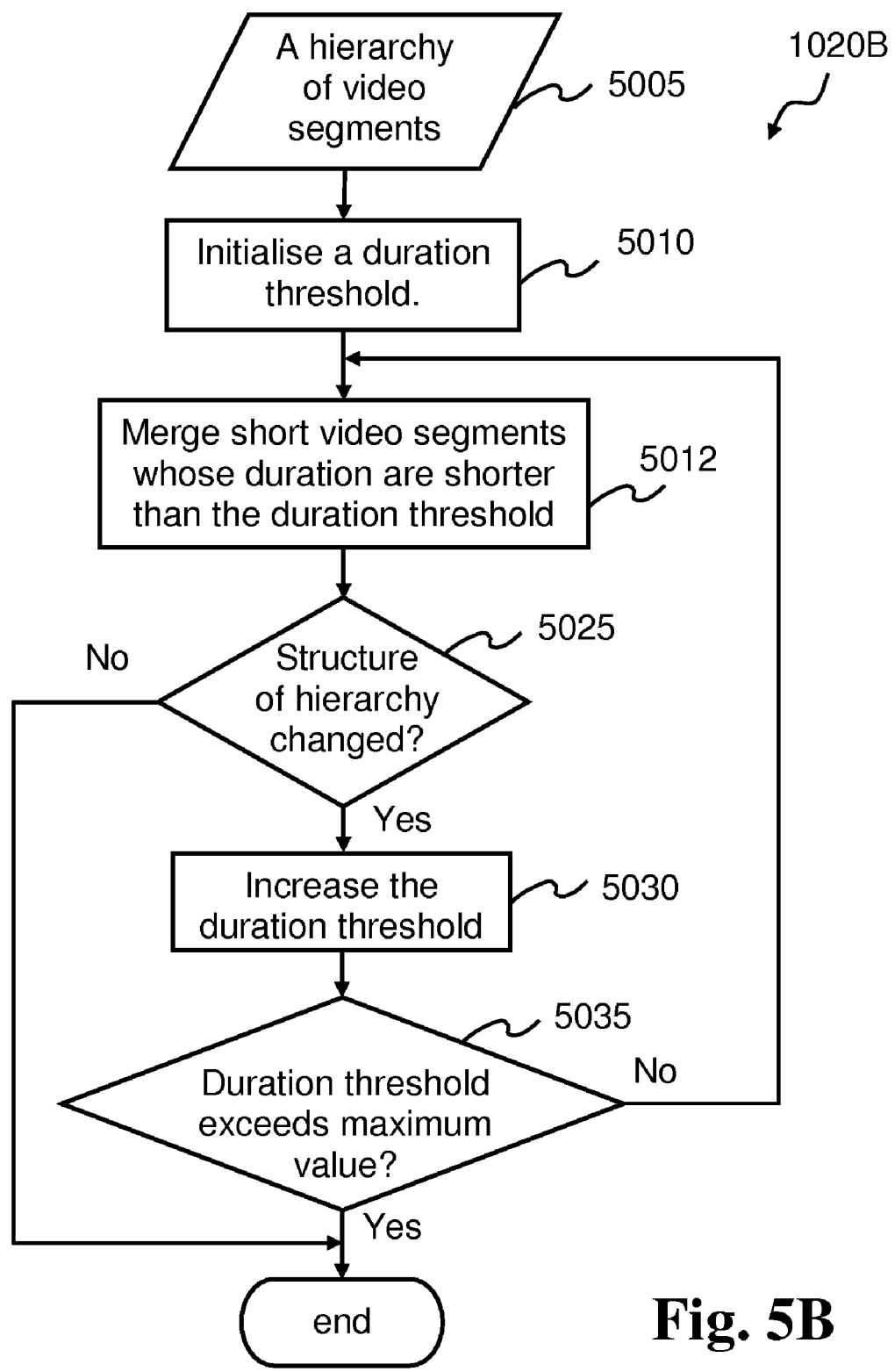

FIG. 5B shows an alternate example 1020B of the merging process of step 1020. In this process 1020B, the merging steps of FIG. 5A are repeated with a larger and larger duration threshold (starting from a small threshold) until there is no change to the video segment hierarchy or until a predefined threshold maximum is reached. In step 5010, the duration threshold is initialised to a pre-determined value, say 2 seconds. Then, in step 5012, the merging steps (5015, 5020) of FIG. 5A are carried out. At the end of step 5012, the duration of all the video segments of the hierarchy will be equal to or greater than the current duration threshold. Step 5025 allows merging to stop if there is no structural change to the video segment hierarchy as a result of the last iteration of the merging steps irrespective of the duration of the shortest video segments. If the hierarchy structure has not been modified, the merging process is considered as completed; otherwise, the merging process continued at step 5030. In step 5030, the current duration threshold is increased by a pre-determined amount or by a value that is a function of the duration of the video being segmented. For example, the current duration threshold may be increased by 1 second. In step 5035, the current duration threshold is checked against a maximum value. The maximum value may be supplied as an input to the merging process, as a pre-determined value that applies to all videos or be a function of the duration of the video being segmented. Depending on the particular application, the maximum value may be taken as 1/20 of the duration of the input source video. If the current duration threshold exceeds the maximum value, the merging process is considered as completed; otherwise, control is returned to step 5015.

In some implementations, it may also be necessary to impose some maximum depth on the video segment hierarchy. For instance, a video browser showing videos with more than 3 nested levels of segmentation may be hard to navigate on a TV screen. To ensure that the depth of the video segment hierarchy is not more than a pre-determined maximum, a compacting process can be performed after the hierarchy of video segments has been created.

Figure 6:
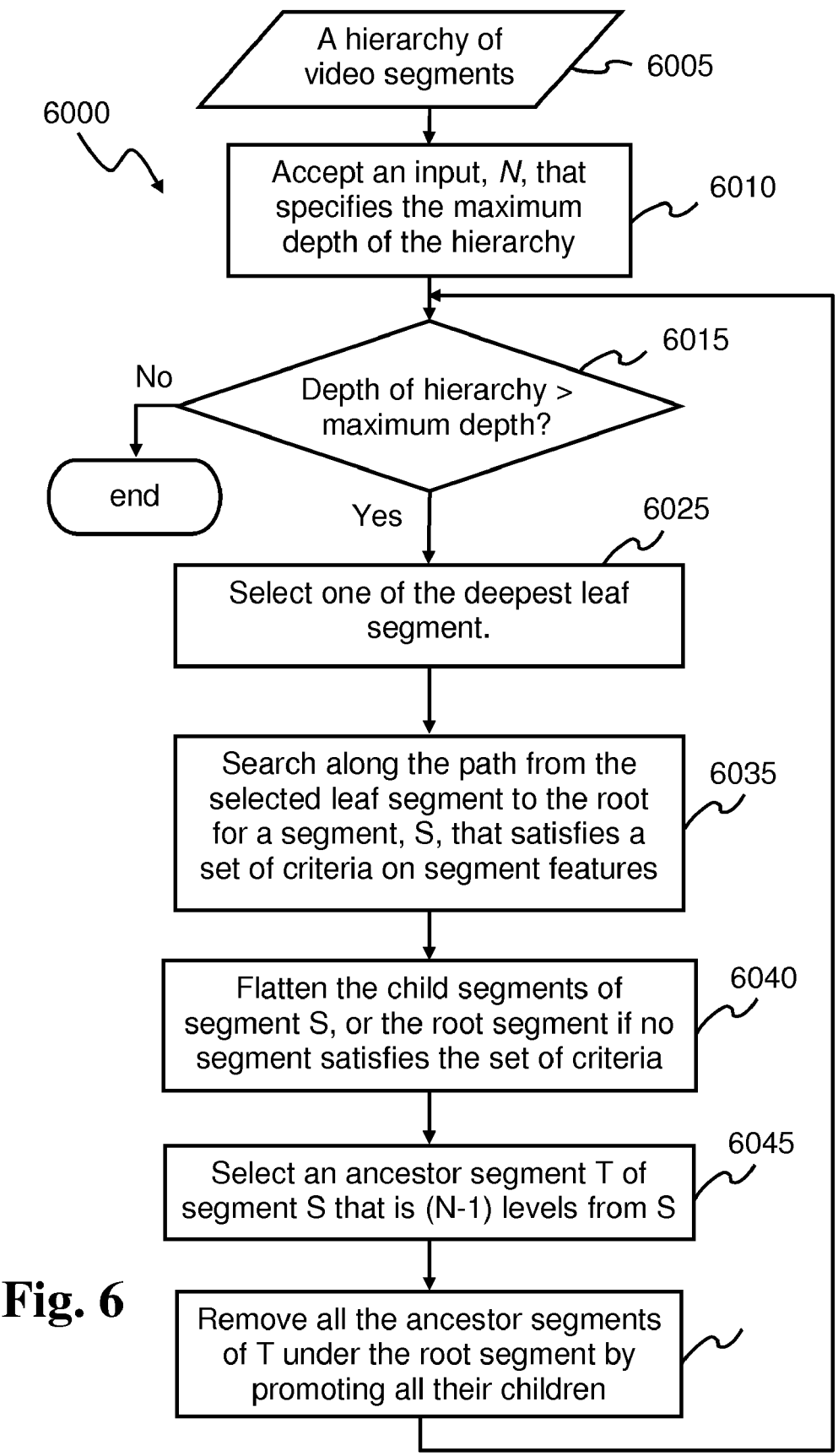
FIG. 6 is a flowchart illustrating the key steps of the process used for compacting a cluster hierarchy in the exemplary implementation.

FIG. 6 depicts the key steps of an exemplary compacting process 6000. The process 6000 uses the hierarchy of video segments 6005 as input and in step 6010 also accepts an input, N, that specifies the maximum depth of the hierarchy. In step 6015, the current depth of the video segment hierarchy 6005 is checked against the maximum depth, N. If the current depth is less than or equal to the maximum depth, no compacting is required and the compacting process terminates. If the current depth exceeds the maximum depth, control is transferred to step 6025 which selects one of the deepest leaf segments (that is, segments with frames only) for the hierarchy. Desirably, the first deepest leaf segment, encountered by traversing the segment hierarchy in a depth first manner, is selected. Then, in step 6035, the segments along the path from the selected leaf segment to the root of the hierarchy are analysed in turns to search for a segment, S, that satisfies a predetermined set of criteria on segment features. The search stops at the first segment that meets the predetermined set of criteria. In one implementation, the set of segment features require segment S to contain child segments with a mean duration that is at least 1/8 of the duration of the video, or 5 seconds, whichever is larger. In step 6040, the child segments, if any, of segment S found in step 6035 are flattened. If no segment that satisfies the set of predetermined set of segment features was found in step 6035, the root segment is flattened and subsequent steps of 6045 and 6050 will have no effect. Step 6045 selects an ancestor segment T of segment S that is (N−1) levels from the segment S or the root segment if there are less than (N−1) levels between S and the root segment. In step 6050, all the ancestor segments of segment T under the root segment, if any, are removed by promoting all their children segments (including those not on the path between T and the root segment) to take their place. Control is then transferred back to step 6015 to check the depth of the hierarchy again. If the current depth is less than or equal to the maximum depth, no farther compacting is required and the compacting process terminates. If the current depth still exceeds the maximum depth, the compacting steps 6025 to 6050 are repeated.

It should be clear from the description of the compacting process of FIG. 6 that the leaf clusters of the resulting hierarchy of clusters may come from clusters at different levels of the original hierarchy of clusters. Moreover, the process can also be used to compact a multi-level hierarchy of clusters into a single-level, that is, into a sequence of clusters.

The process of FIG. 6 can be used for compacting a hierarchy of clusters of arbitrary items provided that a corresponding set of cluster features is specified for step 6035. For instance, the process may be used to compact hierarchies of photograph clusters.

Once the input video sequence of frames has been segmented and/or clustered into a hierarchy of segments, such may recorded onto a computer readable storage medium such as an optical disk or magnetic hard disk drive. The recording then may be reproduced either linearly or through selection of one or more segments formed by the processed described herein.

INDUSTRIAL APPLICABILITY

The arrangements described are applicable to the computer and data processing industries, and particularly to the processing of video content to identify segments thereof for review and/or editing. By using compressed video, the segmentation arrangements presently disclosed can be performed quickly in comparison to existing arrangements, and are well suited to integration onto a single chip. This permits segmentation being performed in video cameras and the like. Further, segmentation may be performed "on-the-fly" for example during an initial storing of compressed video, or during subsequent transfer or manipulation of the compressed video file.

The foregoing describes only some embodiments of the present invention, and modifications and/or changes can be made thereto without departing from the scope and spirit of the invention, the embodiments being illustrative and not restrictive. For example, whilst the flowcharts and processes described above are directly applicable to software implementations of the present disclosure, such may be integrated into hardware in the form of application specific integrated circuits (ASICs), or implemented using programmable logic arrays or like to achieve hardware implementations. For example, such ASICs may thus form a means for determining differences between the size of successive compressed frames in media time, and as means for grouping the frames to create a hierarchy of clusters of successive frames as video segments using a clustering process, wherein the clustering process uses the size differences to determine boundaries between clusters at each level of said hierarchy. Such implementations may find specific use in digital video cameras and the like. One or more ASICs may be used as required.

What is claimed is:

1. A computer-implemented method of segmenting a compressed video, containing a plurality of frames, into a multi-level hierarchy of video segments, said method comprising:
    determining differences between the size of successive compressed frames in media time;
    sorting successive pairs of the frames in increasing order of the determined size difference;
    using a successive pair of the frames as a seed for a new cluster;

selecting a neighboring frame at one boundary of the new cluster;

grouping the frames to create a hierarchy of clusters of successive frames as video segments using a clustering process operative upon at least one said seed, wherein: (a) if the selected neighboring frame does not belong to an existing cluster, then the selected neighboring frame is included in the new cluster if the selected neighboring frame meets a predetermined set of clustering criteria for frames; and (b) if the selected neighboring frame belongs to an existing cluster, then the existing cluster is included as a child cluster of the new cluster if the existing cluster meets a predetermined set of clustering criteria for child clusters; and storing at least a representation of the segments.

2. A method according to claim 1, wherein said clustering process comprises:

processing, in the sorted order, a next pair of frames, each frame of the next pair not being a member of an existing cluster, said processing using the next pair as a seed for a new cluster in a cluster growing process; and repeating the processing until all frames of the plurality are clustered.

3. The method according to claim 2, wherein said cluster growing process of the new cluster comprises the steps of:

(i) selecting the neighboring frame in terms of media time a boundary of the new cluster;

(ii) performing steps (a) and (b);

(iii) repeating steps (i) and (ii) until both of the neighboring frames at the boundaries of the new cluster do not meet said the predetermined sets of clustering criteria.

4. The method according to claim 3, wherein the predetermined set of clustering criteria for frames compares a set of properties of the selected frame against statistics of a subset of the frames of the new cluster on the set of properties.

5. The method according to claim 3, wherein the predetermined set of clustering criteria for a child cluster compares statistics of a subset of the frames of the child cluster on a set of properties against statistics of a subset of the frames of the new cluster on the set of properties.

6. The method according to claim 4, wherein the set of properties includes at least one of the following properties: size of compressed frame, DC term, macroblock coding model, motion vectors, bitrate, dominant color, color histogram, and the presence of people in the frame.

7. The method according to claim 2, further comprising the step of:

merging each segment of a subset of the segments that are shorter than a pre-determined duration with at least one neighboring segment to form a second hierarchy of video segments with longer segments.

8. The method according to claim 7, further comprising the step of:

compacting the second hierarchy of video segments by flattening video segments that do not satisfy a pre-determined set of criteria of segment properties to form a third hierarchy of video segments.

9. The method according to claim 2, further comprising the step of:

compacting a first hierarchy of video segments by flattening video segments that do not satisfy a pre-determined set of criteria of segment properties to form a second hierarchy of video segments.

10. The method according to claim 8, wherein the predetermined set of criteria of segment properties comprises at least segment duration, and a duration of child segments.

11. The method according to claim 9, wherein the predetermined set of criteria of segment properties comprises at least segment duration, and a duration of child segments.

12. The method according to claim 7, wherein said merging step comprises the steps of:

accepting a duration threshold as input;

merging consecutive short segments with duration smaller than the duration threshold into longer segments having duration longer than the duration threshold; and merging each remaining short segment with the neighboring long segment where the joining frames of those segments comply with a predetermined set of frame properties.

13. The method according to claim 7, wherein said merging step comprises:

(i) initializing a duration threshold to a predetermined value;

(ii) merging consecutive short segments with duration smaller than said the duration threshold into longer segments having duration longer than the duration threshold;

(iii) merging each remaining short segment with the neighboring long segment where the joining frames of those segments satisfy a predetermined set of frame properties; and (iv) increasing the duration threshold by a predetermined amount and repeating steps (ii) to (iii) until there is no change to the segment hierarchy in the last iteration or a pre-determined maximum for the duration threshold has been exceeded.

14. A computer-implemented method of compacting a hierarchy of clusters of stored items, said method comprising:

(a) accepting an input, N, specifying a maximum depth for the hierarchy of clusters;

(b) selecting one deepest leaf cluster of the hierarchy of clusters;

(c) searching along a path from the selected leaf cluster to a root for a cluster, C, that satisfies a pre-determined set of criteria of cluster properties;

(d) flattening child clusters of the cluster C or the child clusters of the root cluster if no cluster C is found;

(e) selecting an ancestor cluster T of the cluster C that is (N−1) levels from cluster C, or the root segment if there are less than (N−1) levels between the cluster C and the root cluster;

(f) removing all ancestor clusters between the ancestor cluster T and the root cluster and replacing the removed ancestor clusters by their related children clusters;

(g) repeating steps (b) to (f) until the depth of the hierarchy of clusters is smaller than or equal to the maximum depth; and (h) storing the hierarchy of clusters.

15. The method according to claim 14, wherein each cluster comprises a sequence of video frames forming a segment.

16. The method according to claim 15, wherein the predetermined set of criteria for selecting one of the deepest leaf cluster includes criteria on duration of the segment or the duration of the child segments.

17. The method according to claim 8, wherein said compacting step comprises the steps of:

(a) accepting an input, N, specifying a maximum depth for the hierarchy of clusters;

(b) selecting one deepest leaf cluster of said the hierarchy of clusters;

(c) searching along a path from the selected leaf cluster to a root for a cluster, C, that satisfies a pre-determined set of criteria of cluster properties;

(d) flattening child clusters of the cluster C or the child clusters of the root cluster if no cluster C is found;

(e) selecting an ancestor cluster T of the cluster C that is (N−1) levels from cluster C, or the root segment if there are less than (N−1) levels between the cluster C and the root cluster;

(f) removing all ancestor clusters between the ancestor cluster T and the root cluster and replacing the removed ancestor clusters by their related children clusters; and (g) repeating steps (b) to (f) until the depth of the hierarchy of clusters is smaller than or equal to the maximum depth.

18. A storage medium having recorded thereon at least one compressed video sequence segmented according to the method of claim 1.

19. A computer readable storage medium having a computer program recorded thereon, the program being executable by a computer apparatus to segment a compressed sequence of video frames, the program comprising:

code for determining differences between the size of successive compressed frames in media time;

code for sorting successive pairs of the frames in increasing order of the determined size difference;

code for using a successive pair of the frames as a seed for a new cluster;

code for selecting a neighboring frame at one boundary of the new cluster;

code for grouping the frames to create a hierarchy of clusters of successive frames as video segments using a clustering process operative upon at least one said seed, wherein: (a) if the selected neighboring frame does not belong to an existing cluster, then the selected neighboring frame is included in the new cluster if the selected neighboring frame meets a predetermined set of clustering criteria for frames; and (b) if the selected neighboring frame belongs to an existing cluster, then the existing cluster is included as a child cluster of the new cluster if the existing cluster meets a predetermined set of clustering criteria for child clusters; and code for storing the hierarchy of video segments.

20. An apparatus for segmenting a compressed sequence of video frames, said apparatus comprising:

means for determining differences between the size of successive compressed frames in media time;

means for sorting successive pairs of the frames in increasing order of the determined size difference;

means for using a successive pair of the frames as a seed for a new cluster;

means for selecting a neighboring frame at one boundary of the new cluster;

means for grouping the frames to create a hierarchy of clusters of successive frames as video segments using a clustering process operative upon at least one said seed, wherein: (a) if the selected neighboring frame does not belong to an existing cluster, then the selected neighboring frame is included in the new cluster if the selected neighboring frame meets a predetermined set of clustering criteria for frames; and (b) if the selected neighboring frame belongs to an existing cluster, then the existing cluster is included as a child cluster of the new cluster if the existing cluster meets a predetermined set of clustering criteria for child clusters; and means for storing the hierarchy of video segments.

21. A digital video camera comprising an apparatus according to claim 20.

* * * * *